(12) United States Patent
Hervé et al.

(10) Patent No.: US 12,203,829 B2
(45) Date of Patent: Jan. 21, 2025

(54) AEROSOL TEST CHAMBER

(71) Applicant: PHILIP MORRIS PRODUCTS S.A., Neuchâtel (CH)

(72) Inventors: Pierre Hervé, Froideville (CH); Maria Gomez Lueso, Lausanne (CH); Emmanuel Gérard René Rouget, Fontaines (CH); Markus Silvan Widmer, Thun (CH)

(73) Assignee: Philip Morris Products S.A., Neuchâtel (CH)

( * ) Notice: Subject to any disclaimer, the term of this patent is extended or adjusted under 35 U.S.C. 154(b) by 319 days.

(21) Appl. No.: 17/802,770

(22) PCT Filed: Feb. 23, 2021

(86) PCT No.: PCT/IB2021/051517
§ 371 (c)(1),
(2) Date: Aug. 26, 2022

(87) PCT Pub. No.: WO2021/171177
PCT Pub. Date: Sep. 2, 2021

(65) Prior Publication Data
US 2023/0087674 A1 Mar. 23, 2023

(30) Foreign Application Priority Data
Feb. 27, 2020 (EP) .................................... 20159864

(51) Int. Cl.
*G01N 1/22* (2006.01)
(52) U.S. Cl.
CPC ....... *G01N 1/22* (2013.01); *G01N 2001/2223* (2013.01)

(58) Field of Classification Search
CPC .......................... G01N 1/22; G01N 2001/2223
(Continued)

(56) References Cited

U.S. PATENT DOCUMENTS

2020/0088628 A1* 3/2020 Gan ....................... G01N 15/06

FOREIGN PATENT DOCUMENTS

| CN | 103674626 | | 3/2014 |
| CN | 103674626 A | * | 3/2014 |
| JP | 2007301343 | | 11/2007 |

OTHER PUBLICATIONS

Translation of CN-103674626-A (Year: 2014).*
(Continued)

*Primary Examiner* — Nathaniel T Woodward
(74) *Attorney, Agent, or Firm* — Mueting Raasch Group

(57) ABSTRACT

An apparatus for studying aerosol includes a test chamber having panels defining an enclosed interior volume. The panels have (i) a first wall having a surface defining an interior of the test chamber, (ii) a second wall defining an exterior of the test chamber, (iii) a void space between the first and second walls, (iv) a panel inlet in communication with the void space, and (v) a panel outlet in communication with the void space. The apparatus includes a chamber inlet port and a chamber outlet port, each extending through one of the panels and in communication with the enclosed interior volume. The apparatus includes a fan disposed in, and positioned and configured to mix air in, the enclosed interior volume. The apparatus includes a trap port extending through one of panels and includes a valve to permit sampling of the contents in the enclosed interior volume.

14 Claims, 10 Drawing Sheets

(58) Field of Classification Search
USPC .......................................................... 73/865.6
See application file for complete search history.

(56) References Cited

OTHER PUBLICATIONS

International Preliminary Report on Patentability for PCT/IB2021/051517, issued by the European Patent Office, May 25, 2022: 28 pgs.
International Search Report and Written Opinion for PCT/IB2021/051517, issued by the European Patent Office on May 25, 2021; 21 pgs.
European Search Report for EP 20159864.6, issued by the European Patent Office, Aug. 28, 2020; 34 pgs.
Ichitsubo et al., "Development of a radon-aerosol chamber at NIRS-general design and aerosol performance," Aerosol Science, 2004;35:217-232.
"Temperature and Humidity Test Chamber" Xi'an LIB Environmental Simulation Industry, Online. Downloaded from the Internet on Aug. 24, 2022; [online: https://www.lib-industry.com/product-category/temperature-and-humidity-test-chamber/;4 pgs.
Climtech 50L small scale test chamber (https://www.climtech.dk/climpaq-50I/). Downloaded from the internet on Aug. 26, 2022; 1 pg.

* cited by examiner

AEROSOL TEST CHAMBER

This application is the § 371 U.S. National Stage of International Application No. PCT/IB2021/051517, filed 23 Feb. 2021, which claims the benefit of European Application No. 20159864.6, filed 27 Feb. 2020, the disclosures of which are incorporated herein by reference.

The present disclosure relates to an apparatus for studying aerosol; in particular, the apparatus comprising a test chamber in which a property or characteristic of an aerosol may be studied.

Test chambers of various sizes are commercially available. Some known test chambers have housings formed from glass walls. Glass housings allow for visual observation of the test chamber but tend to suffer from condensation on the inner surface of the glass walls during testing. Such condensation may interfere with the testing of aerosols due to sorption of the aerosol with the condensed water droplets.

Moreover, the known test chambers typically have a large door that opens to allow the test chamber to be cleaned and to allow test articles, such as aerosol generating articles, to be introduced into the chamber. Opening such a large door during testing may be disruptive to the environment in the test chamber.

According to aspects of the present invention, there is provided an apparatus for studying aerosol. The apparatus comprises a test chamber comprising one or more panels defining an enclosed interior volume. Each of the one or more panels has a first wall having a surface defining an interior of the test chamber and has a second wall defining an exterior of the test chamber. A void space is defined between the first and second walls. Each of the panels comprises a panel inlet in communication with the void space and a panel outlet in communication with the void space. The apparatus also comprises a chamber inlet port and a chamber outlet port. The chamber inlet port extends through one of the one or more panels and defines an air inlet conduit in communication with the enclosed interior volume of the test chamber. The chamber outlet port extends through one of the one or more panels and defines an air outlet conduit in communication with the enclosed interior volume of the test chamber. The apparatus also comprises a fan and a trap port for sampling contents from the enclosed interior volume. The fan is disposed in the enclosed interior volume of the test chamber and is positioned and configured to mix air in the enclosed interior volume. The trap port extends through one of the one or more panels and comprises a valve to permit sampling of the contents in the enclosed interior volume.

The apparatus may comprise a test chamber, which may comprise one or more panels defining an enclosed interior volume. Each of the one or more panels may have a first wall having a surface defining an interior of the test chamber and may have a second wall defining an exterior of the test chamber. A void space may be defined between the first and second walls. Each of the panels may comprise a panel inlet in communication with the void space and a panel outlet in communication with the void space. The apparatus may also comprise a chamber inlet port and a chamber outlet port. The chamber inlet port may extend through one of the one or more panels and may define an air inlet conduit in communication with the enclosed interior volume of the test chamber. The chamber outlet port may extend through one of the one or more panels and may define an air outlet conduit in communication with the enclosed interior volume of the test chamber. The apparatus may also comprise a fan and a trap port for sampling contents from the enclosed interior volume. The fan may be disposed in the enclosed interior volume of the test chamber and may be positioned and configured to mix air in the enclosed interior volume. The trap port may extend through one of the one or more panels and may comprise a valve to permit sampling of the contents in the enclosed interior volume.

Apparatuses configured in the manner described above may reduce or prevent condensation from forming on the first wall of the panel defining the test chamber. For example, heated air may flow through the void space between the first and second walls. The flow of heated air through the void space may heat the first wall relative to a temperature in the enclosed interior volume of the test chamber. Such relative heating of the first wall may reduce or prevent condensation. Reduction or prevention of condensation within the enclosed interior volume may advantageously reduce or prevent sorption or reaction of test aerosol or other components of the conditioned air in the enclosed interior volume with condensed water. Accordingly, accuracy and reliability of test results may be improved.

Any suitable heated fluid medium may pass through the void space between the first wall and the second wall of the panel to prevent or reduce condensation on a surface of the first wall defining the enclosed interior volume of the test chamber. Heated air is one example of a suitable fluid medium.

The first and second walls of the panels may be formed from any suitable material. Preferably, at least the surface of the first wall that defines the interior of the test chamber is inert. Any suitable inert material may be used. The inert material may form the bulk of the first wall or may be coated on the surface of the first wall. Preferably, the surface of the first wall that defines the interior of the interior of the test chamber is hydrophobic. Hydrophobic materials tend to be inert with respect to aerosol.

Examples of suitable materials for forming the bulk of the first and second walls include glass, plastic, and metallic materials. Examples of suitable plastic materials include polycarbonate, polyetheretherketone (PEEK), and the like. Examples of suitable metal materials include aluminium, stainless steel, and the like. The materials may be inherently inert or may be treated or coated to be inert. For examples, coatings or treatments may be applied to the surface to render surfaces inert. As an example, a metal, such as aluminium, may be anodized.

Preferably, the first and second walls of the panels are formed from transparent material to allow visual observation of the enclosed interior space. The entire panel or a portion of the panel may be transparent to allow visual observation of the enclosed interior space. Preferably, the entire panel or a majority of the panel is transparent. Suitable transparent materials for forming the first and second walls of the panels include transparent plastics or glass. Preferably, the first and second walls of the panels comprise glass. In addition to being transparent and inert, glass is readily cleanable with detergent and water and tends to be scratch resistant.

The first and second walls may be of any suitable thickness. For example, the first and second walls may have a thickness of from 1 millimetre to 20 millimetres, such as from 2 millimetres to 15 millimetres, or from 3 millimetres to 10 millimetres. The thickness of the first and second walls may be the same or different. In some examples, the first and second walls comprise glass and have a thickness from 3 millimetres to 10 millimetres. Preferably, the glass walls have a thickness of 5 millimetres.

The first and second walls may be separated from one another to form a void space of any suitable thickness. For example, the void space may have a thickness from 5 millimetres to 50 millimetres, such as from 10 millimetres to 25 millimetres.

The panel comprises an inlet in communication with the void space and an outlet in communication with the void space. One or both of the panel inlet and the panel outlet may be formed by a port. The port may be coupled to a conduit for carrying air flowing to or from the void space. In some examples, the panel inlet is formed by a port coupled to a conduit and the panel outlet comprises an opening in communication with the ambient environment.

The test chamber may comprise more than one panel. For example, the test chamber may comprise a top panel, a bottom panel, and one or more sidewall panels. In some examples, the test chamber comprises a top panel, a bottom panel, a front sidewall panel, a back sidewall panel, a left sidewall panel, and a right sidewall panel.

One of the one or more sidewall panels may be hingedly moveable from an open position to a closed position. In the closed position, the sidewall panel may enclose the interior volume of the of the test chamber. Preferably, the sidewall panel, in the closed position, seals the enclosed interior volume of the test chamber from an exterior environment. In the open position, the interior of the test chamber may be accessible. Accordingly, when the sidewall panel is in the open position, a user may access the interior of the test chamber to, for example, clean or maintain the interior of the test chamber.

The panels may comprise a frame configured to retain the first and second walls of the panel. The frame may define the panel inlet, the panel outlet, or the panel inlet and the panel outlet. The frame may be configured to retain more than one panel.

Preferably, the frame sealingly engages the panels such that the enclosed interior volume of the test chamber is airtight relative to an ambient environment.

One or more sealing elements may be employed to seal the panels relative to the frame. Any suitable sealing element may be employed. For example, synthetic rubber or fluoropolymer elastomers, such as Viton, strips or cords may be employed to seal the edges of the panels relative to the frame. Preferably, the sealing element is inert or any portion of the sealing element that may be in communication with the enclosed interior volume of the test chamber is inert.

The frame may comprise an inert material. Preferably, any portion of the frame that may be in communication with the enclosed interior volume of the test chamber is inert. The frame, or portions of the frame, may be coated or treated to be inert. The frame may comprise plastic, such as polycarbonate, or metallic material, such as aluminium or stainless steel. In some examples, the frame comprises anodized aluminium. Anodized aluminium may be inert to aerosol, which may be tested or studied within the enclosed interior volume of the test chamber.

The test chamber may comprise a door to allow access to the enclosed interior volume. The door may be formed in one of the panels or may comprise one of the panels. The door preferably provides access to the interior of the test chamber so that the interior may be cleaned or maintained. The door is preferably sealed when closed. For example, when the door is closed, the enclosed interior volume may be sealed or air-tight relative to the ambient atmosphere.

A sidewall panels that is hingedly moveable from an open position to a closed position may be attached to the frame by hinges. One or more sealing element may be employed to seal the moveable panel relative to the frame when the sidewall panel is in the closed position. In some examples, the sidewall panel is configured to be magnetically maintained in the closed position. In some examples, the panel is configured to be maintained in the closed position via a latch.

The test chamber may be of any suitable shape. The one or more panels may be configured and arranged to achieve an appropriate shape of the test chamber. In some examples, the test chamber is rectangular. Preferably, the enclosed interior volume and exterior shape of the test chamber is rectangular.

The test chamber may be of any suitable size. Preferably, the test chamber is configured to be placed on a cart that may be manually moved. Placing the test chamber on a cart having wheels allows the test chamber to be portable. In some examples, the enclosed interior volume of the test chamber is from 0.1 cubed metres to 1 cubed metre, such as 0.1 cubed metres to 0.5 cubed metres, or from 0.2 cubed metres to 0.3 cubed metres. For example, the enclosed interior volume may have a length from 500 millimetres to 1500 millimetres, such as from 750 millimetres to 1250 millimetres.

The chamber inlet port may be structured to extend through the first and second walls of a first panel of the one or more panels such that air flowing through the inlet port does not flow through the void space of the panel. The chamber outlet port may be structured to extend through the first and second walls of a second panel of the one or more panels such that air that flowing through the inlet of the inlet port and outlet port does not flow through the sealed void space of the panel. Such an arrangement allows for conditioned air to enter the enclosed interior volume of the chamber without contamination.

The conditioned air that enters the chamber inlet port may be filtered. For example, the conditioned air may be purified by passing through a filter. Any suitable filter may be used. Examples of suitable filters include a HEPA filter, a charcoal filter, or a HEPA filter and a charcoal filter. The use of purified air may aid in avoiding contamination. The use of purified air may improve accuracy and reliability of test results.

The first and second panels may be substantially parallel to one another. Preferably, the first and second panels are substantially parallel to one another and are arranged such that airflow from the chamber inlet port to the chamber outlet port is substantially perpendicular to airflow generated by the fan. Such a configuration may assist the airflow from the fan to mix conditioned air flowing through the enclosed interior volume of the test chamber from the chamber inlet port to the chamber outlet port. In other words, the fan may be positioned within the chamber to cause airflow generally parallel to the top and bottom panels. The first panel through which the chamber inlet port extends may be a bottom panel, and the second panel through which the chamber outlet port extends may be the top panel. Conditioned air may flow within the enclosed interior volume generally from the bottom to the top, and the fan may cause air to flow generally perpendicular to the flow from the chamber inlet to the chamber outlet to mix the conditioned air with, for example, aerosol being tested within the test chamber.

Preferably, the chamber inlet port is coupled to a conduit to carry conditioned air from a humidifier to the enclosed interior volume of the test chamber. The flow rate of conditioned air into the enclosed interior volume of the test chamber via the chamber inlet port may be regulated to control pressure in the enclosed interior volume of the test chamber.

The chamber outlet port may be coupled to a valve configured to control release of air from the enclosed interior volume of the test chamber. The valve may be manually adjusted to control the release rate or may be controlled via automation. For example, the valve may be coupled to a motor configured to open or close the valve, and the motor may be coupled to a controller. The apparatus may comprise a pressure sensor. The pressure sensor may be operably coupled to the controller. The controller may cause the motor to open or close the valve based on sensed pressure.

Pressure in the enclosed interior volume may be controlled by controlling the flow rate of conditioned air into the enclosed interior volume. The flow rate of conditioned air into the enclosed interior volume may be controlled by setting parameters of the humidifier. The parameters may be set manually, or the setting of the parameters may be automated. For example, the humidifier may be operably coupled to a controller. The controller may be coupled to a pressure sensor. The controller may cause the humidifier to alter the flow rate from the humidifier based on sensed pressure.

In some examples, pressure in the enclosed interior volume is controlled by controlling flow rate of conditioned air into the enclosed interior volume and the rate of release of air from the enclosed interior volume. One or both of flow rate into and out of the enclosed interior volume may be controlled manually or automatically. In some examples, the flow rate into the enclosed interior volume is controlled automatically and the flow rate out of the enclosed interior volume is controlled manually.

In some examples, the flow rate into and out of the enclosed interior volume is controlled automatically. The chamber outlet port may be operably coupled to a valve. The valve may be operably coupled to a motor configured to open and close the valve. The motor may be operably coupled to a controller configured to cause the motor to open and close the valve. The inlet chamber port may be operably coupled to a humidifier. The humidifier may be coupled to the controller. The controller may be configured to control the rate of flow of conditioned air into the enclosed interior volume via the chamber inlet port. The apparatus may comprise a pressure sensor positioned and adapted to measure pressure within the enclosed interior volume. The pressure sensor may be operably coupled to the controller. The controller may be configured to cause the rate of flow from the humidifier and the rate of release of air via the valve to change as a result of data provided by the pressure sensor.

The chamber inlet port and the chamber outlet port may be sealed relative to the panels through which they extend through the use of a sealing element. For example, the ports may be sealed relative to the panels with O-rings.

The apparatus may comprise an antechamber extending from one of the one or more panels. The antechamber may define a sealed antechamber port extending through the first and second walls of the panel. The apparatus may further comprise a tray disposed in the antechamber. The tray may comprise a first wall and a second wall. The tray may be slidable from a first position to a second position. In the first position, the first wall may seal the antechamber port from the interior of the test chamber. In the second position, the second wall may seal the antechamber from the exterior of the test chamber. The antechamber may be used for introducing articles, such as aerosol-generating articles, into the enclosed interior volume of the test chamber by placing the article on the tray and sliding the tray from the first position to the second position. Such a configuration may reduce disruption of the environment within the enclosed interior volume of the test chamber. Because the enclosed interior volume of the test chamber is sealed when the tray is in the first position and when the tray is in the second position, the enclosed interior volume of the test chamber may be exposed to the exterior environment only while the tray is being slid from the first position to the second position.

Preferably, the antechamber comprises a pivotable lid moveable from an open position to a closed position. In the closed position, the lid may prevent access to an interior of the antechamber. When the lid is in the open position, a user may access the interior of the antechamber. The lid may aid in reducing the disruption of the environment within the enclosed interior volume of the test chamber. For example, the lid may be closed when the tray is slid from the second position to the first position or from the first position to the second position. Accordingly, the enclosed interior volume of the test chamber may be exposed to only the volume of external air in the antechamber if the lid is closed. When the lid is on the antechamber or in a closed position, the lid preferably seals the interior of the antechamber from the ambient environment.

The apparatus may comprise more than one antechamber. Preferably, the apparatus comprises two antechambers. When the apparatus has more than one antechamber, more than one object may be introduced and placed in communication with the enclosed interior volume of the test chamber at the same time. In addition or alternatively, one object may be introduced in one chamber as another object is removed from another chamber.

The antechamber may be of any suitable shape. For example, the antechamber may have the shape of a rectangular box.

The apparatus may comprise a trap port extending through one of the one or more panels. The trap port may comprise a valve to permit sampling of the contents in the enclosed interior volume. The valve may be opened to extract a sample and may be closed to enclose the interior volume of the test chamber.

The apparatus may comprise more than one trap port. The trap ports may be positioned at a variety of positions about the test chamber. Positioning of the trap ports at various different positions about the test chamber allows samples from the enclosed interior volume of the test chamber to be extracted at different locations. The samples extracted at different positions may be compared to determine if the test aerosol and the conditioned air flowing from the chamber inlet port are homogenously mixed and distributed throughout the enclosed interior volume.

The apparatus may comprise any suitable number of trap ports. In some examples, the apparatus comprises 5 or more trap ports, such as 10 or more trap ports. In some examples, the apparatus comprises 50 or less traps ports, such as 20 or less trap ports. For example, the apparatus may comprise from 5 trap ports to 50 trap ports, such as from 10 trap ports to 20 trap ports.

The apparatus may comprise trap ports extending through more than one panel. The apparatus may comprise more than one trap port extending through a particular panel. In some examples, the apparatus comprises multiple trap ports extending through a first panel, and multiple trap ports extending through one or more additional panel. For example, the apparatus may comprise multiple trap ports extending through a top panel, multiple trap ports extending through a front panel, and multiple trap ports extending through a back panel. For example, the apparatus may comprise from 5 trap ports to 15 trap ports, such as 8 trap ports, extending through the top panel, may comprise from 2 trap ports to 5 trap ports, such as 3 trap ports, extending through the front panel, and may comprise from 2 trap ports to 5 trap ports, such as 3 trap ports, extending through the back panel. In some examples, one of the panels, such as the front panel, through which the trap ports extend also serves as the door for accessing the interior volume of the test chamber.

The trap ports may be sealed relative to the panels through which they extend through the use of a sealing element. For example, the trap ports may be sealed relative to the panels with O-rings.

The apparatus may comprise a dilution valve operably coupled to the chamber inlet port. The dilution valve may permit external aerosol, gases, or other components to be mixed with conditioned air directed through the chamber inlet port. The dilution valve may mix the aerosol, gases, or other components to be mixed with the conditioned air prior to entry into the test chamber. The provision of a dilution valve may advantageously enable the chamber to simulate a wide range of specific environmental situations for the aerosol study.

The apparatus may comprise an exposure panel port through which at least a portion of an exposure panel may be inserted into the enclosed interior volume of the test chamber. The exposure panel may chemically or physically react with aerosol within the enclosed interior volume of the test chamber. The exposure panel port may be configured to allow the exposure panel to be inserted into or removed from the enclosed interior volume of the test chamber with little disruption of the environment within the enclosed interior volume. Accordingly, the exposure panel may be inserted or removed from the enclosed interior volume during testing without substantial disruption of the environment.

The exposure panel port may comprise a sealing element that seals the port when the exposure panel is not inserted within the port. The sealing element may comprise a flap, a plug, or the like. The plug may comprise an O-ring. The sealing element, such as a plug, may be removed to insert the exposure panel and may be replaced following removal of the exposure panel from the port. In addition or alternatively, the sealing element, such as a flap, may deflect as the exposure panel is inserted through or removed from the exposure panel port.

When inserted into the exposure panel port, the exposure panel preferably sealingly engages the exposure panel port. For example, the exposure panel may comprise a sealing element, such as a strip or O-ring, which engages the port when the exposure panel is inserted into the exposure panel port.

The removal of a plug from an exposure panel port to insert an exposure panel should not result in substantial contamination of the enclosed interior volume of the test chamber with ambient air, if the enclosed interior volume is maintained at a relative positive pressure.

The apparatus may comprise more than one exposure panel port. For example, the apparatus may comprise 2, 3, 4, or 5 exposure panel ports. Preferably, the apparatus comprises two or at least two exposure panel ports.

The exposure panel port may extend across any suitable panel of the test chamber. For example, the exposure panel port may extend across a top panel of the test chamber.

The apparatus may be included in a system. The system may comprise air moving apparatus operably coupled to one or both of the panel inlet and the panel outlet of the one or more panels of the test chamber. The panel inlet and panel outlet may be formed by a frame configured to retain the panel. The air moving apparatus causes air to flow through the void space between the first and second walls of the one or more panels of the test chamber. Preferably, the temperature of the air moving through the void space is higher than the temperature of the air in the enclosed interior volume of the test chamber. Movement of air through the void space between the first and second walls of the panel may prevent or reduce condensation on a surface of the first wall that defines the interior of the test chamber. The air moving apparatus may comprise a blower operably coupled to the panel inlet, a source of compressed air operably coupled to the panel inlet, a vacuum applied to the panel outlet, or the like.

In some examples, the test chamber comprises more than one panel. In such examples, the system may include a manifold operably coupled to each panel inlet, to each panel outlet, or each panel inlet and each panel outlet. The manifold may be operably coupled to the air moving apparatus such that the air moving apparatus and the manifold causes air to flow through void space of each panel.

The system may comprise a heating element configured to heat air that enters the panel inlet. Movement of air through the void space between the first and second walls of the panel may prevent or reduce condensation on a surface of the first wall that defines the interior of the test chamber, particularly if the temperature of the air in the void space is higher than the temperature within the enclosed interior volume of the test chamber. A heater may be advantageously employed to heat the air entering the panel inlet to a temperature above the temperature within the enclosed interior volume of the test chamber.

Adjustment of the heater may be performed manually or automatically. The heater may be operably coupled to a controller. The controller may also be operably coupled to the humidifier. The controller may adjust the heater based on the temperature settings of the humidifier.

The system may include one or more temperature sensors to monitor temperature of one or more of (i) conditioned air flowing into the enclosed interior volume of the test chamber, (ii) air within the enclosed interior volume of the test chamber, or (iii) air flowing out of the enclosed interior volume. The system may include one or more temperature sensors to monitor temperature of one or more of air flowing into the panel inlet, the void space of the panel, or the panel outlet. The temperature sensors may be operably coupled to the controller. The controller may adjust the relative temperature of the air in the enclosed interior volume of the test chamber and the temperature in the void space of the panel based on data provided from the one or more temperature sensors.

In some examples, the air moving apparatus comprises a hot air blower operably coupled to the panel inlet. Any suitable hot air blower may be employed.

The system may comprise a humidifier operably coupled to the chamber inlet port. The humidifier may provide conditioned air to the enclosed interior volume of the test chamber. The conditioned air may be of a particular temperature and humidity. The humidifier may be configured to provide the conditioned air to the enclosed interior volume at a defined flow rate.

The system may comprise a controller operably coupled to the humidifier. The controller may be configured and adapted to control the humidifier to control one or more of the temperature, the humidity, and the flow rate of conditioned air delivered by the humidifier to the enclosed interior volume of the test chamber.

The system may further comprise an aerosol-generating device. The aerosol-generating device may be configured to introduce aerosol into the enclosed interior volume of the test chamber. The aerosol-generating device may be positioned within the enclosed interior volume of the test chamber. In some examples, the aerosol-generating device may be retained on a tray in an antechamber. In some examples, the aerosol-generating device is operably coupled to the dilution valve to introduce aerosol to the enclosed interior volume of the dilution valve.

Any suitable aerosol-generating device may be used to generate the aerosol. Examples of suitable aerosol-generating devices include combustible cigarettes, heat-not-burn aerosol-generating articles in which an aerosol-generating substrate is heated to an extent sufficient to release one or more constituents of the substrate in an aerosol but not to an extent sufficient to combust the substrate, aerosol-generating articles in which a liquid aerosol-generating substrate is vaporized or atomized (or vaporized and atomized) to generate an aerosol, and the like.

The systems and apparatuses described herein may be used in any suitable manner. Preferably, the system and apparatuses are used to study aerosol. The apparatuses and systems described herein may be used to study any suitable aspect of an aerosol. For example, one or more of (i) material chemical compound emission may be studied; (ii) sensory properties, such as olfactometery properties, may be studied; and (iii) atmospheric and environmental impact may be studied. In some examples, the properties of second-hand aerosol, or third-hand (or second-hand and third-hand) aerosol may be studied. The apparatuses and systems may be used to assess the ability of one or more sensors to detect one or more compounds associated with the aerosol in a controlled environment.

According to various aspects of the present invention, a method for studying aerosol comprises flowing air in the void space defined between the first and second walls of the one or more panels of the apparatus for studying aerosol. The method also comprises introducing conditioned air or compressed gasses to the enclosed interior volume of the test chamber via the chamber inlet port. The conditioned air has a defined temperature and humidity and is introduced at a defined flow rate. The method also comprises introducing aerosol to the enclosed interior volume of the test chamber and mixing, via the fan, the aerosol with the conditioned air within the enclosed interior volume of the test chamber. The method further comprises sampling the mixed aerosol and conditioned air. The mixed air and conditioned air may be sampled via the trap port. If the apparatus comprises an antechamber, the mixed air and conditioned air may be sampled via the antechamber. If the apparatus comprises an exposure panel port, the mixed air and conditioned air may be sampled via an exposure panel retained by the exposure panel port. The exposure panel may be removed via the exposure panel port.

By flowing air through the void space defined by the first and second walls of the panels, condensation on a surface of the first wall that defines the interior volume of the test chamber may be reduced or prevented. Preferably, the air flowed through the void space has a temperature greater than the temperature in the enclosed interior volume of the test chamber. Ideally, the difference between the temperature of air flowed through the void space and the temperature in the enclosed interior volume of the test chamber is 5 degrees Celsius or less. The temperature of the air flowed through the void space may be related to the temperature and humidity of conditioned air entering the chamber inlet port.

Sampling via one or more of the trap port, the antechamber, and the exposure panel, preferably results in minimal disruption of the environment in the enclosed interior volume of the test chamber.

The method may further comprise testing a property of the sampled mixed aerosol and conditioned air.

The apparatuses, systems, and methods described herein provide a controlled environment within an enclosed interior volume of a test chamber. The temperature, humidity, and flow rate of conditioned air entering the chamber inlet may be regulated to control the temperature and humidity within the enclosed interior volume. The flow rate into the test chamber and out of the test chamber may be regulated to control the pressure within the test chamber. Accordingly, the environment within the enclosed interior volume of the test chamber may be different from the ambient environment.

The apparatuses, systems, and methods described herein are designed to reduce or prevent condensation on surfaces defining the enclosed interior volume of the test chamber. Reducing condensation minimizes effects of unintended sorption of aerosol to the condensed moisture. As such, accuracy and reliability of testing of aerosols within the enclosed interior volume of the test chamber may be enhanced.

The apparatuses, systems, and methods described herein preferably allow for visual observation of testing as it occurs. For example, one or more panels that form the test chamber may be transparent. The ability for visual observation allows for identification of potential problems, such as inadvertent extinguishment of a combustible aerosol-generating article. The ability for visual observation also allows the test chambers to be used for demonstration purposes.

The apparatuses, systems, and methods described herein preferably provide the ability to introduce objects into the enclosed interior volume of the test chamber or to remove objects from the enclosed interior volume of the test chamber with minimal disruption of the environment within the enclosed interior volume. For example, the apparatuses may comprise one or more antechamber for introduction or removal of an object, such as an aerosol-generating article. As another example, an exposure panel may be inserted or removed via an exposure panel port with minimal disruption of the environment within the enclosed interior volume. The use of an antechamber or an exposure panel port, for example, may be less disruptive to the atmosphere than opening a large door to gain access to the enclosed interior volume to introduce the object. In addition or alternatively, the use of an antechamber as described herein may limit introduction of material surfaces, such as gloves, that may sorb or emit compounds that might interfere with testing being performed within the testing chamber.

The apparatuses, systems, and methods are preferably configured to test aerosol in conditioned environments. The test chamber may be sealed to provide an air-tight enclosed interior volume. Alternatively or in addition, the test chamber may be maintained at a positive pressure relative to atmospheric pressure. By keeping a relatively positive pressure in the enclosed interior volume, the test chamber does not need to be completely sealed because air will tend to flow out of the test chamber through any leaks as opposed to flowing into the chamber. The enclosed interior volume may be maintained at a relative positive pressure by controlling the flow rate of air through the chamber inlet port and the chamber outlet port. Preferably, leaks from the interior of the test chamber are kept to a minimum or do not occur. Preferably, the enclosed interior volume is air-tight during testing.

As used herein, the singular forms "a," "an," and "the" also encompass embodiments having plural referents, unless the content clearly dictates otherwise.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

As used herein, "providing," in the context of providing an apparatus or system, means manufacturing the apparatus or system, purchasing the apparatus or system, or otherwise obtaining the apparatus or system.

Any direction referred to herein, such as "top," "bottom," "left," "right," "upper," "lower," and other directions or orientations are described herein for clarity and brevity but are not intended to be limiting of an actual device or system. Devices and systems described herein may be used in a number of directions and orientations.

"Conditioned air" or "conditioned environment" is air or an environment that has predefined temperature and humidity and flow rate. Conditioned air and a conditioned environment may also have predefined composition of components, such as gases and aerosol.

"Inert" means that the inert material does not substantially chemically or physically react with the component being tested, such as aerosol, and that the inert material does not substantially emit substances that may influence the test results by contaminating the component being tested. Equally, an inert material may not substantially sorb the component being tested.

"Sorption" refers to one or both of absorption and adsorption. Absorption is a phenomenon or process in which molecules are taken up in a bulk phase, which may be a liquid or solid material. Adsorption refers to the adhesion of molecules to a surface.

As used herein, a "hydrophobic" surface is a surface that exhibits water repelling properties. A surface may be considered hydrophobic if the surface exhibits a water contact angle of greater than 90 degrees. The "water contact angle" is the angle, conventionally measured through the liquid, where a liquid/vapour interface meets a solid surface. The water contact angle quantifies the wettability of a solid surface by a liquid via the Young equation. Contact angle may be measured by using a contact angle goniometer that employs a microscope objective to view the angle directly. The contact angle may be observed via the microscope objective and determined by viewing a drop of water deposited on the surface.

As used herein, "aerosol" means a suspension of solid particles or liquid droplets, or a combination of solid particles and liquid droplets in a gas. The gas may be air. The solid particles or liquid droplets may comprise one or more volatile flavor compounds. Aerosol may be visible or invisible. Aerosol may include vapors of substances that are ordinarily liquid or solid at room temperature. Aerosol may include vapors of substances that are ordinarily liquid or solid at room temperature, in combination with solid particles or in combination with liquid droplets or in combination with both solid particles and liquid droplets.

As used herein, a "controller" is one or more hardware devices, one or more software or firmware programs, or one or more hardware devices and one or more software or firmware programs that manages or directs flow of data between two or more entities. The controller may include one or more of memory, an Application-Specific Integrated Circuit (ASIC) state machine, a digital signal processor, a gate array, a microprocessor, or equivalent discrete or integrated logic circuitry. A controller may include memory that contains instructions that cause one or more components of the circuitry to carry out a function or aspect of the controller. Functions attributable to a controller in this disclosure may be embodied as one or more of software, firmware, and hardware. The controller may include a microprocessor.

The invention is defined in the claims. However, below there is provided a non-exhaustive list of non-limiting examples. Any one or more of the features of these examples may be combined with any one or more features of another example, embodiment, or aspect described herein.

Example Ex1 An apparatus for studying aerosol, comprising (i) a test chamber comprising one or more panels defining an enclosed interior volume, each of the one or more panels having a first wall having a surface defining an interior of the test chamber and having a second wall defining an exterior of the test chamber, wherein a void space is defined between the first and second walls, wherein each of the panels comprises a panel inlet in communication with the void space and a panel outlet in communication with the void space; (ii) a chamber inlet port extending through one of the one or more panels and defining an air inlet conduit in communication with the enclosed interior volume of the test chamber; (iii) a chamber outlet port extending though one of the one or more panels and defining an air outlet conduit in communication with the enclosed interior volume of the test chamber; (iv) a fan disposed in the enclosed interior volume of the test chamber, the fan positioned and configured to mix air in the enclosed interior volume; and (v) a trap port for sampling contents from the enclosed interior volume, the trap port extending through one of the one or more panels and comprising a valve to permit sampling of the contents in the enclosed interior volume.

Example Ex2 The apparatus of Ex1, wherein the chamber inlet port is structured to extend through the first and second walls of a first panel of the one or more panels such that air flowing through the inlet port does not flow through the void space of the panel, and wherein the chamber outlet port is structured to extend through the first and second walls of a second panel of the one or more panels such that air flowing through the inlet port and outlet port does not flow through the void space of the panel.

Example Ex3 The apparatus of Ex2, wherein the first and second panels are substantially parallel to one another.

Example Ex4 The apparatus of Ex3, wherein airflow from the chamber inlet port to the chamber outlet port is substantially perpendicular to airflow generated by the fan.

Example Ex5 The apparatus of any one of Ex1 to Ex4, further comprising (i) an antechamber extending from one of the one or more panels, the antechamber defining a sealed antechamber port extending through the first and second walls of the panel; and (ii) a tray disposed in the antechamber, the tray being slidable from a first position to a second position, the tray comprising a first wall and a second wall, wherein in the first position, the first wall seals the antechamber port from the interior of the test chamber, and wherein in the second position, the second wall seals the antechamber port from the exterior of the test chamber.

Example Ex6 The apparatus of Ex5, wherein the antechamber comprises a pivotable lid moveable from an open position to a closed position, wherein in the closed position the lid prevents access to the antechamber, and wherein the lid in the open position provides access to the antechamber.

Example Ex7 The apparatus of any one of Ex1 to Ex6, wherein the one or more panels comprises a top panel, a bottom panel, and one or more sidewall panels.

Example Ex8 The apparatus of Ex7, wherein one of the one or more sidewall panels is hingedly moveable from an open position to a closed position, wherein in the closed position the interior of the test chamber is enclosed, and wherein in the open position the interior of the test chamber is accessible.

Example Ex9 The apparatus of any one of Ex1 to Ex8, further comprising a frame, wherein the frame is configured to retain the one or more panels.

Example Ex10 The apparatus of Ex9, wherein the frame comprises anodized aluminium.

Example Ex11 The apparatus of any one of Ex1 to Ex10, wherein the trap port is one of a plurality of trap ports positioned at a variety of positions about the test chamber.

Example Ex12 The apparatus of any one of Ex1 to Ex11, wherein the surface of the first wall that defines the enclosed interior volume of the test chamber is inert.

Example Ex13 The apparatus of any one of Ex1 to Ex12, wherein the surface of the first wall that defines the interior of the test chamber is hydrophobic.

Example Ex14 The apparatus of any one of Ex1 to Ex13, wherein the first wall comprises glass.

Example Ex15 The apparatus of any one of the Ex1 to Ex14, wherein the one or more panels are transparent.

Example Ex16 The apparatus of any one of Ex1 to Ex15, further comprising a dilution valve operably coupled to the chamber inlet port.

Example Ex17 The apparatus of any one of Ex1 to Ex16, comprising an exposure panel port through which at least a portion of an exposure panel may be inserted into the enclosed interior volume of the test chamber.

Example Ex18 A system comprising (i) the apparatus of any one of Ex1 to Ex17; (ii) air moving apparatus operably coupled to one or both of the panel inlet and the panel outlet of the one or more panels of the test chamber, wherein the air moving apparatus is configured to cause air to flow through the void space between the first and second walls of the one or more panels of the test chamber.

Example Ex19 The system of Ex18, wherein the test chamber comprises more than one panel, and wherein the system further comprises a manifold operably coupled to each panel inlet, each panel outlet, or each panel inlet and each panel outlet, wherein the manifold is operably coupled to the air moving apparatus such that the air moving apparatus and the manifold causes air to flow through void space of each panel.

Example Ex20 The system of Ex18 or Ex19, further comprising a heater positioned and adapted to heat air that enters the panel inlet.

Example Ex21 The system of any one of Ex18 to Ex20, further comprising a humidifier operably coupled to the chamber inlet port, the humidifier configured to provide conditioned air to the enclosed interior volume of the test chamber.

Example Ex22 The system of Ex21, comprising a controller operably coupled to the humidifier, wherein the controller is configured and adapted to control the humidifier to control one or more of the air flow rate, temperature, and humidity of the conditioned air provided by the humidifier to the enclosed interior volume of the test chamber.

Example Ex23 The system of Ex22, comprising a valve operably coupled to the chamber outlet port, and wherein the controller is operably coupled to the valve and configured and adapted to cause the valve to open or close to regulate pressure in the enclosed interior volume of the test chamber.

Example Ex24 The system of Ex18 to Ex23, further comprising an aerosol-generating device configured to introduce aerosol into the enclosed interior volume of the test chamber.

Example Ex25 The system of Ex24, wherein the aerosol generating device is positioned within the enclosed interior volume of the test chamber.

Example Ex26 The system of Ex25 as it depends from the apparatus of Ex5, wherein the aerosol generating device retained by the tray.

Example Ex27 The system of Ex24 as it depends from the apparatus of Ex16, wherein the aerosol-generating device is operably coupled to the dilution valve to introduce aerosol to the enclosed interior volume of the test chamber via the dilution valve.

Example Ex28 A method for studying aerosol comprising (i) providing an apparatus according to any one of claims 1 to 17; (ii) flowing air in the void space defined between the first and second walls of the one or more panels; (iii) introducing conditioned air to the enclosed interior volume of the test chamber via the inlet port, wherein the conditioned air has a defined temperature and humidity and is introduced at a defined flow rate; (iv) introducing aerosol to the enclosed interior volume of the test chamber; (v) mixing, via the fan, the aerosol with the conditioned air within the enclosed interior volume of the test chamber; and (vi) sampling the mixed aerosol and conditioned air via the trap port.

Example Ex29 A method for studying aerosol comprising: (i) providing an apparatus according to Ex5 or Ex6; (ii) flowing air in the void space defined between the first and second walls of the one or more panels; (iii) introducing conditioned air to the enclosed interior volume of the test chamber via the inlet port, wherein the conditioned air has a defined temperature and humidity and is introduced at a defined flow rate; (iv) introducing aerosol to the enclosed interior volume of the test chamber; (v) mixing, via the fan, the aerosol with the conditioned air within the enclosed interior volume of the test chamber; and (vi) sampling the mixed aerosol and conditioned air via the antechamber.

Example Ex30 A method for studying aerosol comprising: (i) providing an apparatus according to Ex 17; (ii) flowing air in the void space defined between the first and second walls of the one or more panels; (iii) introducing conditioned air to the enclosed interior volume of the test chamber via the inlet port, wherein the conditioned air has a defined temperature and humidity and is introduced at a defined flow rate; (v) introducing aerosol to the enclosed interior volume of the test chamber; (v) mixing, via the fan, the aerosol with the conditioned air within the enclosed interior volume of the test chamber; and (vi) sampling the mixed aerosol and conditioned air via an exposure panel retained by exposure panel port.

Example Ex31 The method of any one of Ex28 to Ex30, wherein the air flowed through the void space has a temperature greater than the temperature in the enclosed interior volume of the test chamber.

Example Ex32 The method of Ex31, wherein the temperature of the air flowed through the void space is related to the temperature and humidity of conditioned air entering the chamber inlet port.

Example Ex33 The method of any one of Ex28 to Ex32, further comprising testing a property of the sampled mixed aerosol and conditioned air.

Examples will now be further described with reference to the figures in which.

Figure 1:
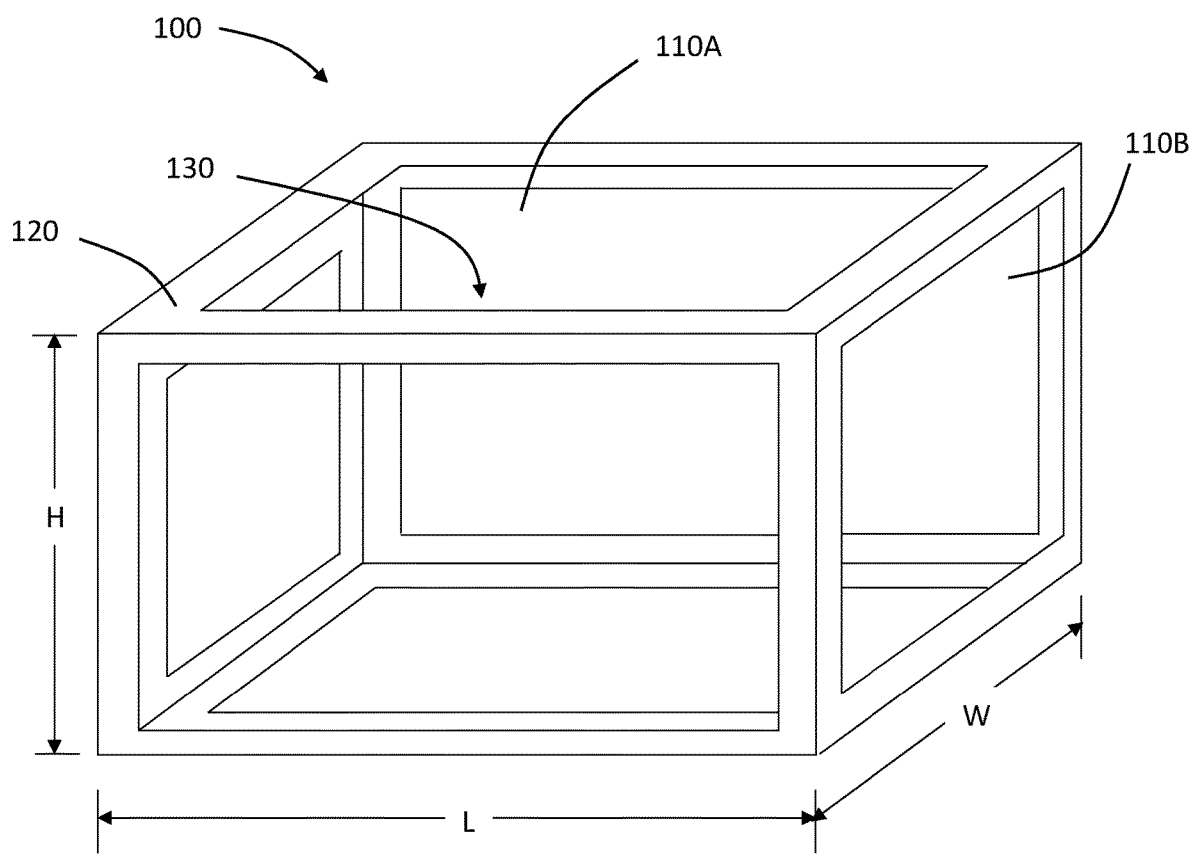
FIG. 1 is schematic perspective view of a test chamber.

FIG. 1 illustrates an example of a test chamber 100. The test chamber 100 comprises a frame 120 configured to retain multiple panels (panels 110A and 110B are labelled). The test chamber 100 includes a top panel 110A, a bottom panel, a front panel, a back panel, a left panel, and a right panel 110B. The panels define an enclosed interior volume 130 in which an aerosol may be tested. The panels 110A, 110B are transparent to allow the enclosed interior volume 130 of the test chamber 100 to be visually observed.

The test chamber 100 has a length L, width W, and height H. As an example, the length L may be 1000 millimetres, the width W may be 500 millimetres, and the height H may be 450 millimetres.

Figure 2:
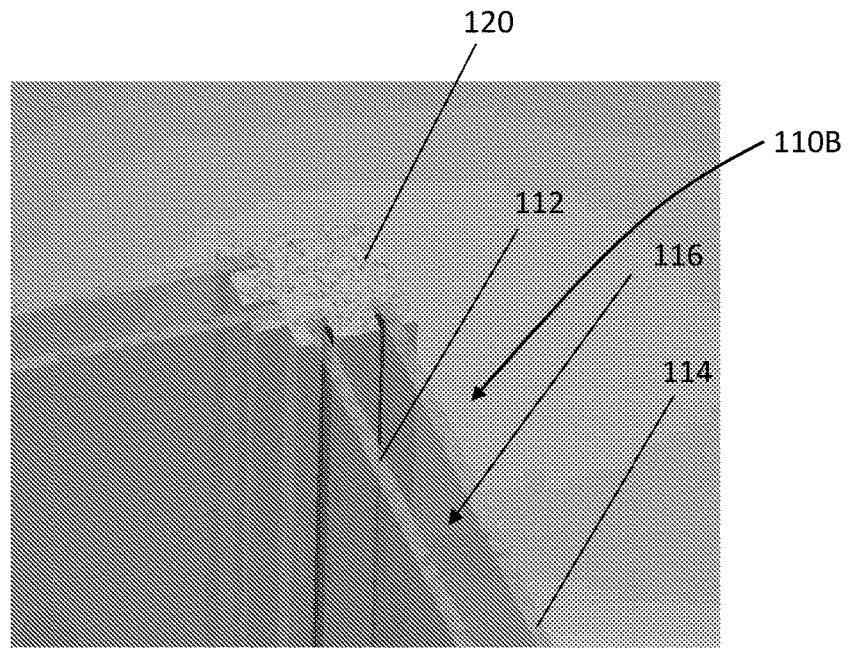
FIG. 2 is a schematic perspective sectional view of panels and a frame of a test chamber.

FIG. 2 illustrates a section of a portion of the frame 120 and panels (panel 110B is labelled). The panel 110B comprises a first wall 112 that defines a portion of the enclosed interior volume of the test chamber. The panel 110B comprises a second wall 114 that defines a portion of an exterior surface of the test chamber. The first 112 and second 114 walls are transparent and may be formed from glass. The first 112 and second 114 walls may have a thickness of 5 mm. A void space 116 is defined between the first 112 and second 114 walls of the panel 110B. Heated air may flow through the void space 116 when the test chamber is in use. The frame 120 may comprise grooves for receiving the first 112 and second 114 walls of the panel 110B to retain the walls 112, 114. Sealing elements (not shown) such as Viton strips may seal the walls 112, 114 within the grooves of the frame 120.

Figure 3:
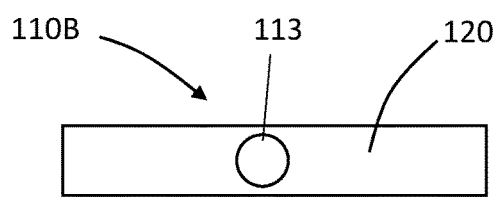
FIG. 3 is a schematic top plan view of a panel.

FIG. 3 is a schematic example of a top plan view of a panel 110B. The panel 110B includes a panel inlet 113 formed through the frame 120. The panel inlet 113 may be operably coupled to a hot air blower to allow heated air to flow through the void space between the first and second walls of the panel 110B.

Figure 4:
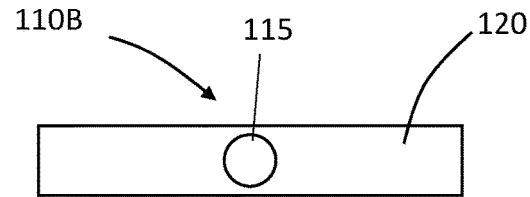
FIG. 4 is a schematic bottom plan view of a panel.

FIG. 4 is a schematic example of a bottom plan view of a panel 110B. The panel 110B includes a panel outlet 115 formed through the frame 120. The panel outlet 115 may be vented directly to ambient atmosphere.

Figure 5:
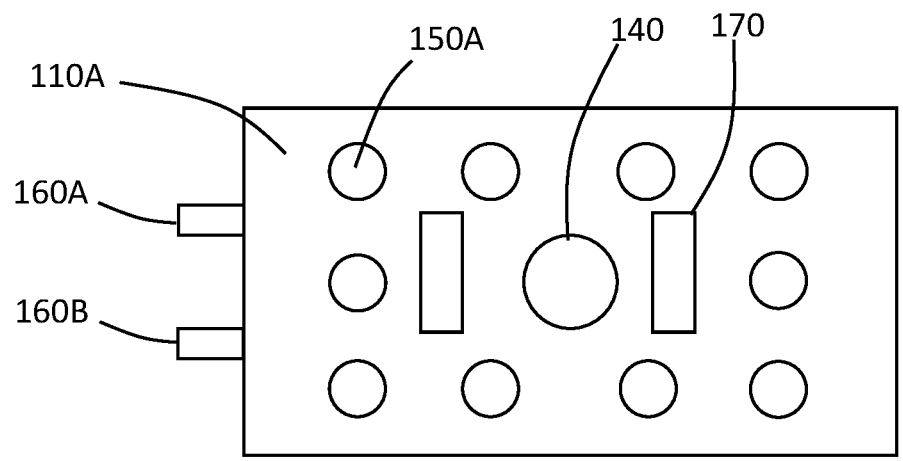
FIG. 5 is a schematic top plan view of an apparatus including a test chamber.

FIG. 5 is a schematic top plan view of an apparatus including a test chamber showing a top panel 110A, antechambers 160A, 160B extending from a side panel of the test chamber, a plurality of trap ports (trap port 150A is labelled), a chamber outlet port 140, and two exposure panel ports 170.

Figure 6:
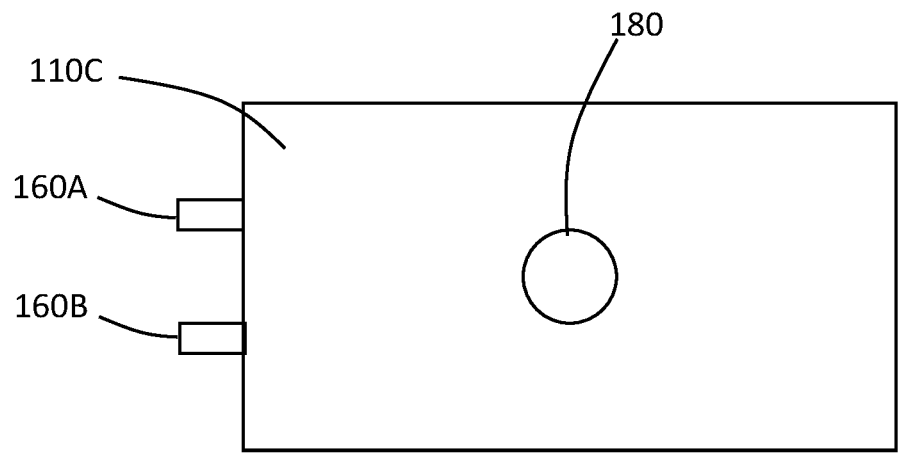
FIG. 6 is a schematic bottom plan view of an apparatus including a test chamber.

FIG. 6 is a schematic bottom plan view of an apparatus including a test chamber showing a bottom panel 110C, antechambers 160A, 160B extending from a side panel of the test chamber, and a chamber inlet port 180.

Figure 7:
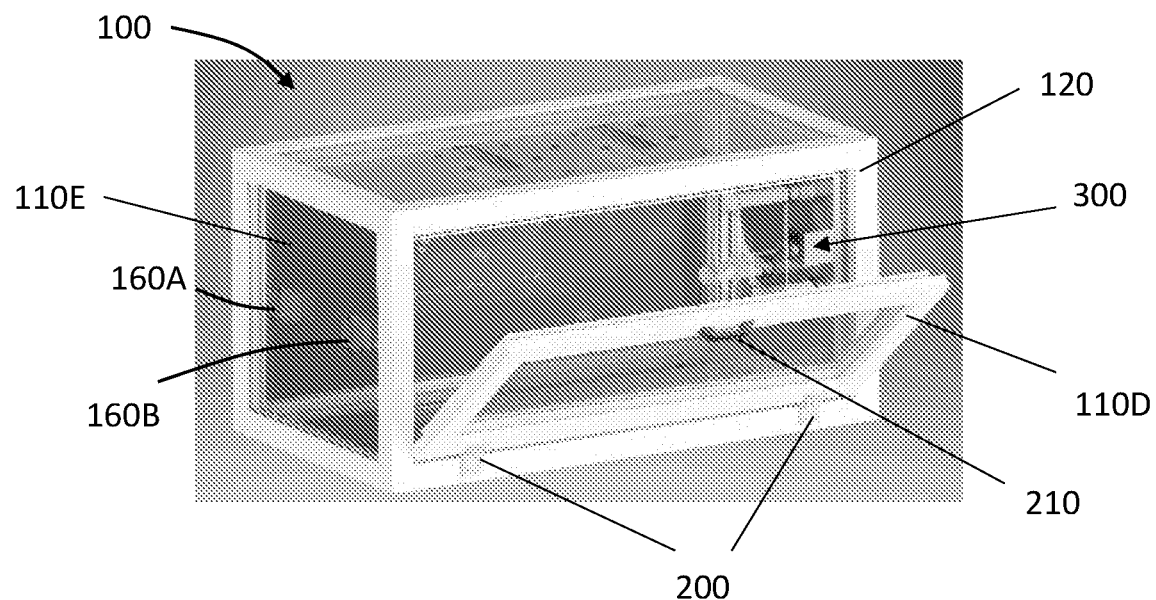
FIG. 7 is a schematic perspective view of a test chamber showing a partially opened panel.

FIG. 7 is a schematic perspective view of a test chamber 100 showing a partially opened front panel 110D. The front panel 110D opens to allow access to the interior volume of the test chamber 100. When the front panel 110D is opened, the interior of the test chamber 100 may be cleaned and components, such as the fan 300, may be serviced. The front panel 110D is connected to the frame 120 by hinges 200. The front panel 110D includes a handle 210 to facilitate opening. When closed, the front panel 110D may be secured relative to the frame 120 via magnetic forces. A sealing element (not shown) may be disposed between the frame 120 and the front panel 110D when the front panel 110D is closed. Antechambers 160A, 160B extend from the left side panel 110E.

Figure 8:
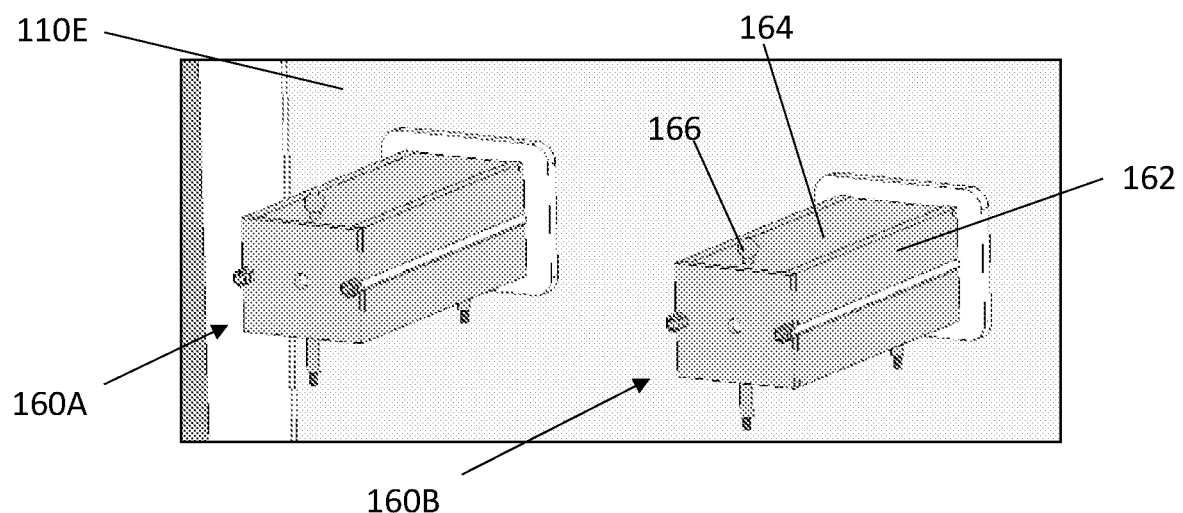
FIG. 8 is a schematic perspective view of a side panel of a test chamber and antechambers extending from the side panel.

FIG. 8 shows a perspective view of antechambers 160A, 160B extending from the left side panel 110E. The antechambers 160A, 160B include a rectangular box 162 and a lid 164. The lid 164 has a handle 166 to facilitate opening.

Figure 9:
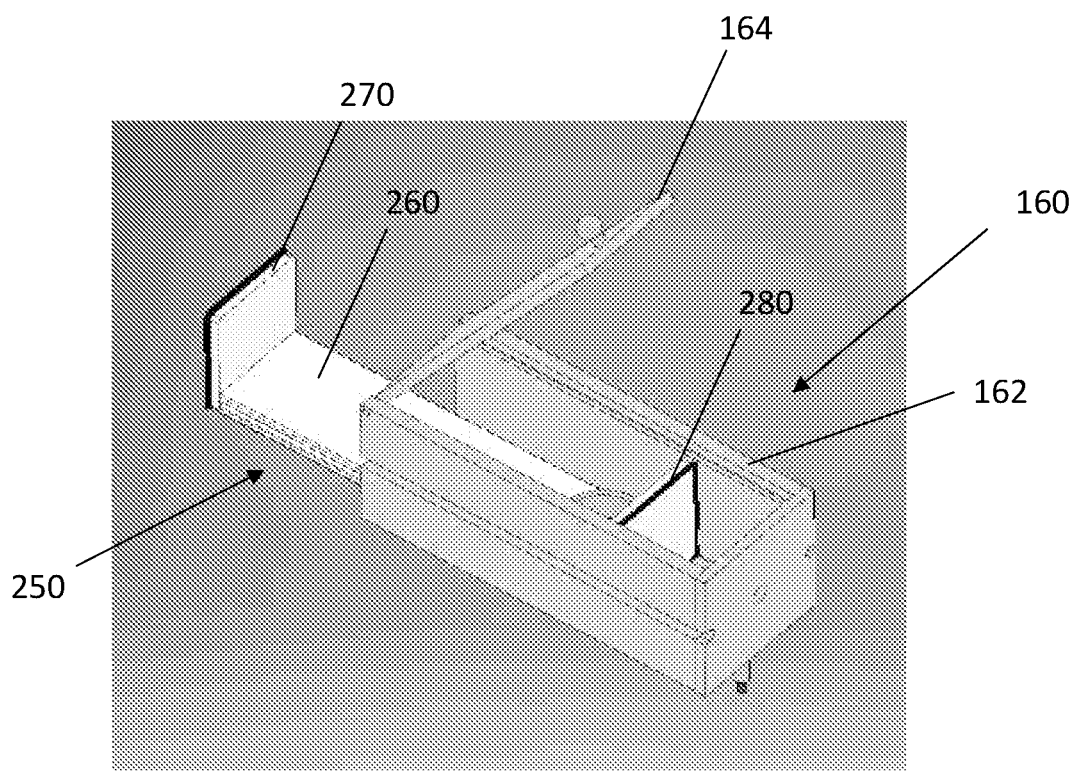
FIG. 9 is a schematic perspective view of an antechamber and a tray.

FIG. 9 is a schematic perspective view of an antechamber 160 and a tray 250 slidable within the antechamber 160. The antechamber 160 comprises a rectangular box 162 and a lid 164 pivotably attached to the box 162. The tray 250 includes a base 260, a first wall 270 attached to the base 260 at one end, and a second wall 280 attached to the base 260 at an opposing end. A pushing element (not shown), such as a rod, may be used to slide the tray 250 relative to the antechamber 160.

Figure 10:
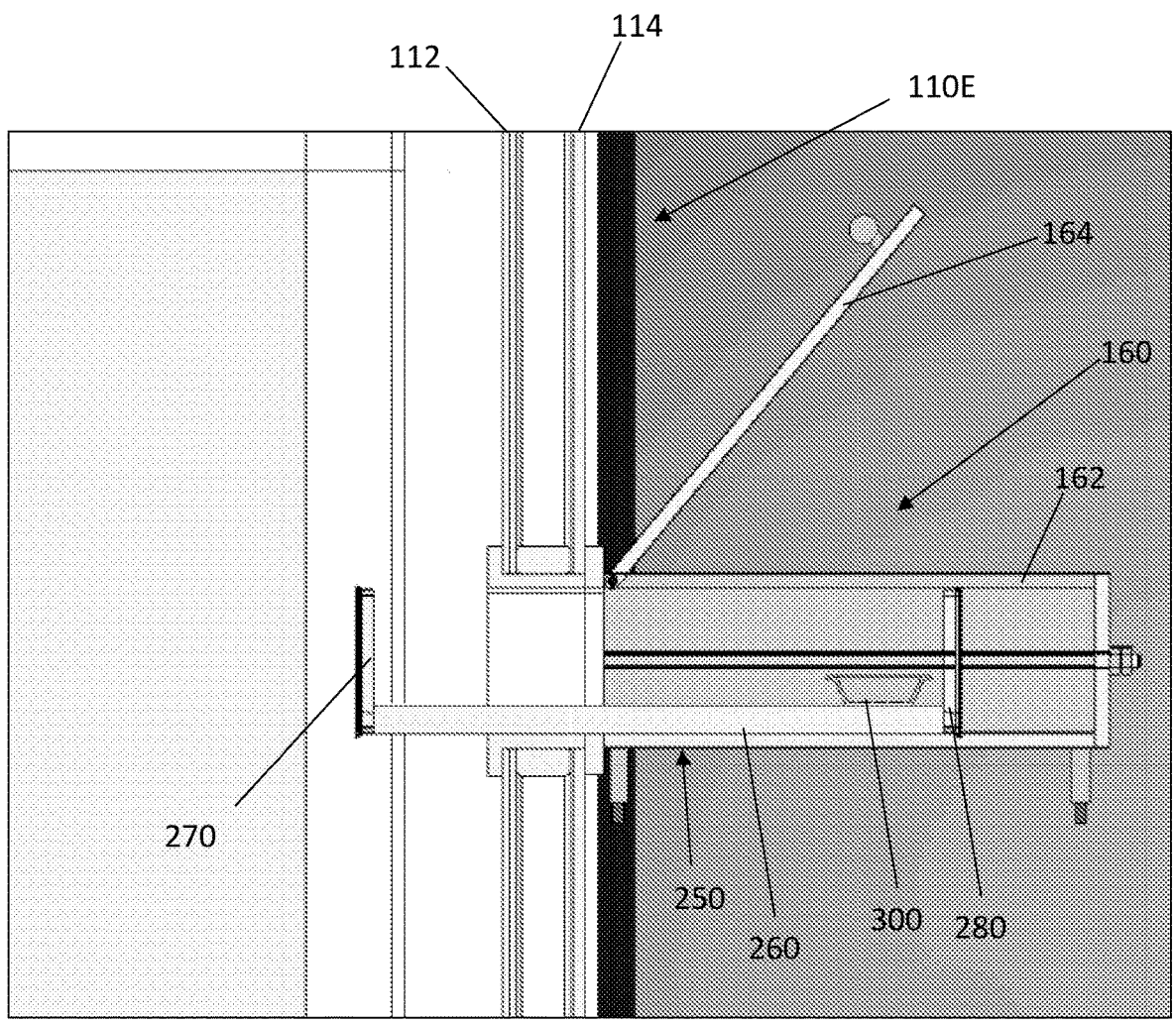
FIG. 10 is a schematic sectional view of an apparatus showing a panel and an antechamber.

FIG. 10 is a schematic sectional view of an apparatus showing a side panel 110E, an antechamber 160 and a tray 250 slidable within the antechamber 160. The panel 110E comprises a first wall 112 that defines a portion of the interior volume of the test chamber. The panel 110E comprises a second wall 114 that defined a portion of the exterior surface of the test chamber. The antechamber lid 164 is shown as open to allow access to the interior of the antechamber box 162. An object 300 may be placed on the tray 250 of the base 260, and the tray 250 may be slid so that the object 300 may be placed in communication with the interior volume of the test chamber. When the tray 250 is fully slid to the right in the orientation depicted in FIG. 10, the second wall 280 of the tray 250 sealingly engages the second wall 114 of the panel 110E. When the tray 250 is fully slid to the left in the orientation depicted in FIG. 10, the first wall 270 of the tray 250 sealingly engages the first wall 112 of the panel 110E.

Figure 11:
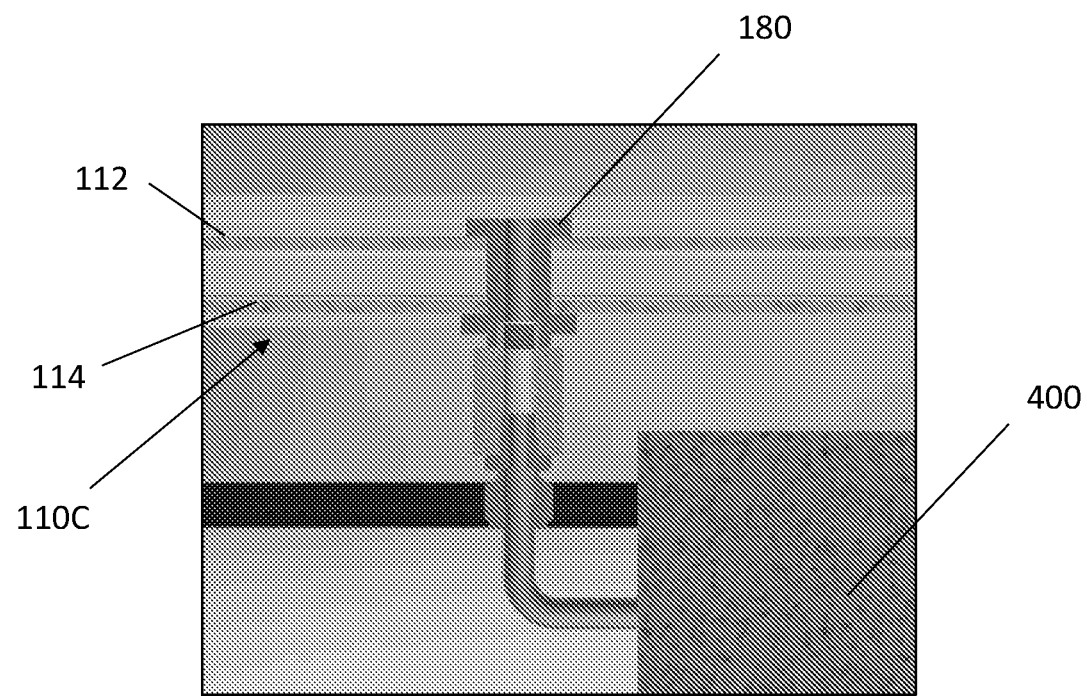
FIG. 11 is a schematic sectional view of a bottom panel showing a chamber inlet port and a humidifier.

FIG. 11 is a schematic sectional view of a bottom panel 110C showing a chamber inlet port 180 and a humidifier 400. The chamber inlet port 180 extends across the first 112 and second 114 walls of the panel 110C. The first wall 112 of the panel 110C defines a portion of the interior volume of the test chamber. The second wall 114 of the panel 110C defines a portion of the exterior surface of the test chamber. The chamber inlet port 180 is operably coupled to the humidifier 400 via a conduit.

Figure 12:
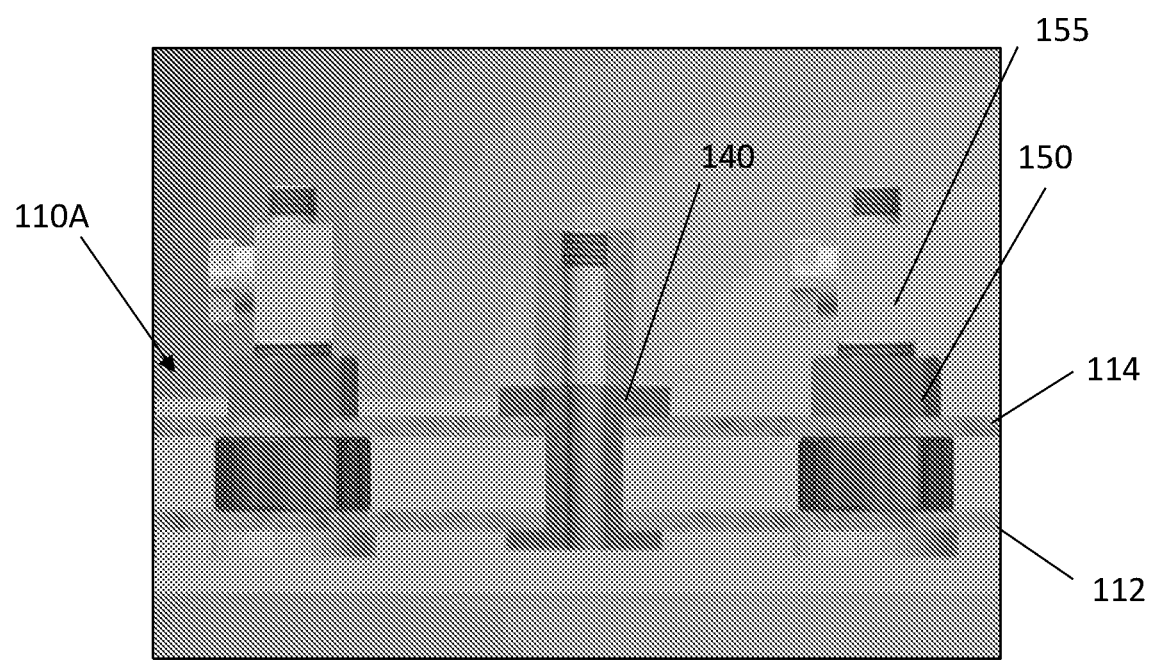
FIG. 12 is a schematic sectional view of a top panel showing a chamber outlet port and a trap port.

FIG. 12 is a schematic sectional view of a top panel 110A showing a chamber outlet port 140 and trap ports 150. The chamber outlet port 180 and the trap ports 150 extend across the first 112 and second 114 walls of the panel 110A. The first wall 112 of the panel 110A defines a portion of the interior volume of the test chamber. The second wall 114 of the panel 110A defines a portion of the exterior surface of the test chamber. The trap ports 150 comprise a valve 155 that may be opened to extract an air sample from the interior volume of the test chamber and may be closed to enclose the interior volume of the test chamber. The chamber outlet port 140 may also include, or may be operably coupled to, a valve (not shown).

Figure 13:
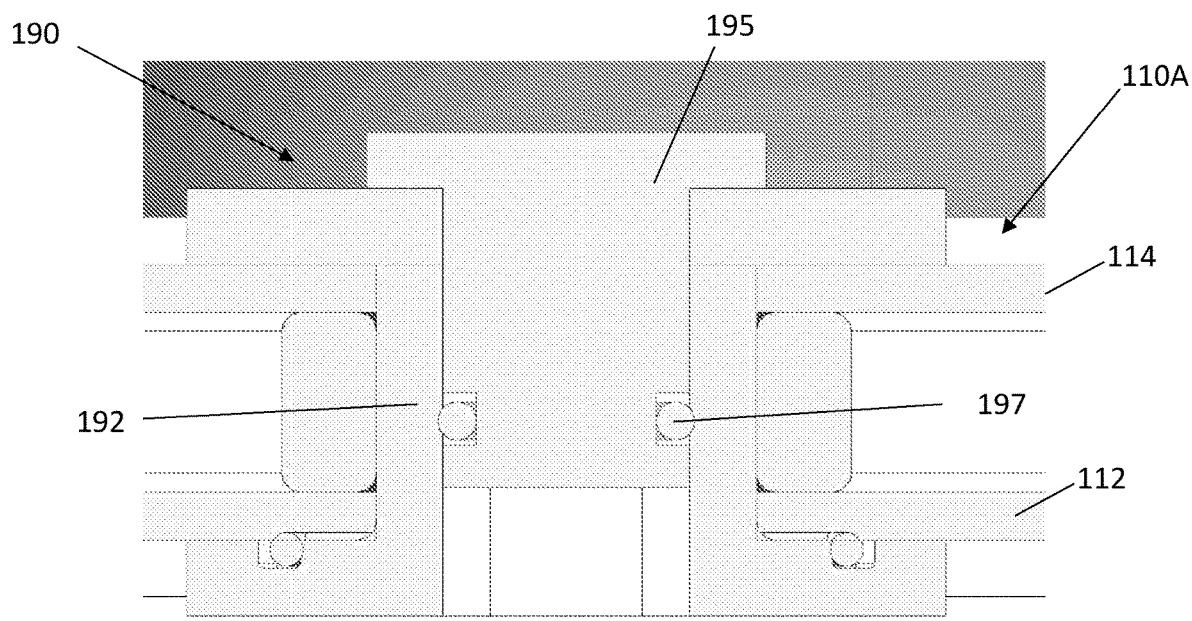
FIG. 13 is a schematic sectional view of a top panel and an exposure panel port.

FIG. 13 is a schematic sectional view of a top panel 110A and an exposure panel port 190. The exposure panel port 190 extends across the first 112 and second 114 walls of the panel 110A. The first wall 112 of the panel 110A defines a portion of the interior volume of the test chamber. The second wall 114 of the panel 110A defines a portion of the exterior surface of the test chamber. The exposure panel port 190 includes a sidewall 192. A plug 195 is disposed in the exposure panel port 190. A sealing element 197, such as Viton strip or O-ring, seals the plug 195 relative to the sidewall 192 of the exposure panel port 190.

Figure 14:
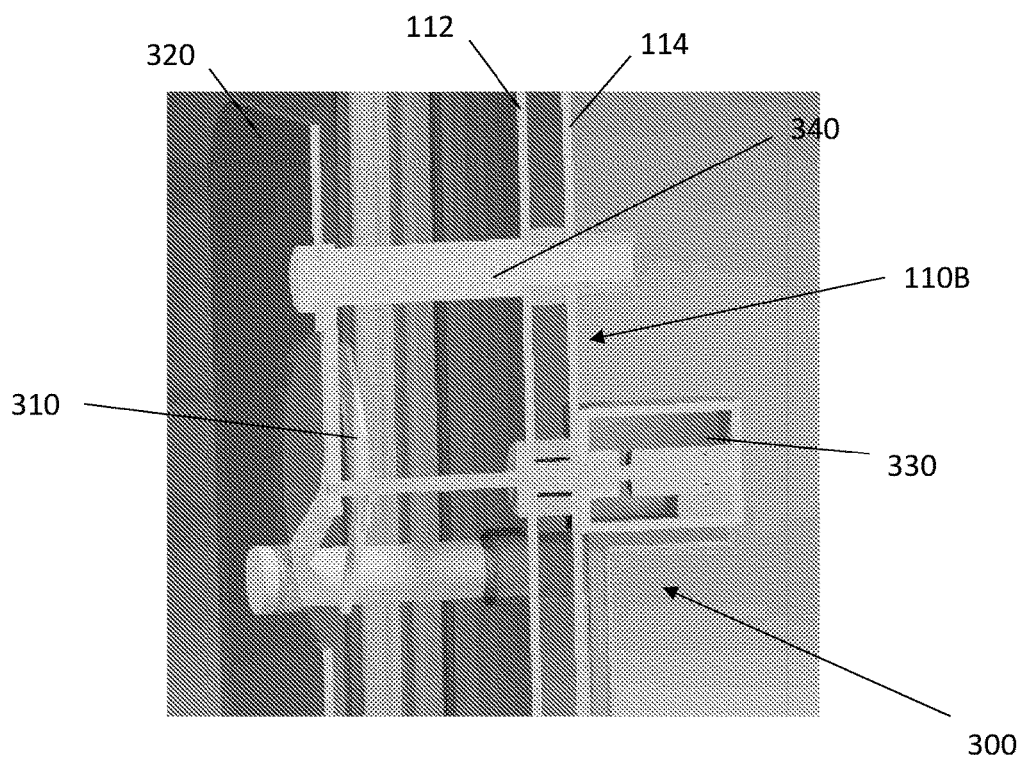
FIG. 14 is a schematic sectional view of a side panel and a fan.

FIG. 14 is a schematic sectional view of a side panel 110B and a fan 300. The panel 110B comprises a first wall 112 and a second wall 114. The first wall 112 of the panel 110B defines a portion of the interior volume of the test chamber. The second wall 114 of the panel 110B defines a portion of the exterior surface of the test chamber. The fan 300 includes a blade 310 operably coupled to a motor 330. The motor 330 is positioned outside the test chamber, and the blades 310 are within the test chamber between the first wall 112 and a fan shield 320, which is part of a housing of the fan 300. Support elements 340 are connected to the shield 320 to retain the fan 300 relative to the panel 110B.

Figure 15:
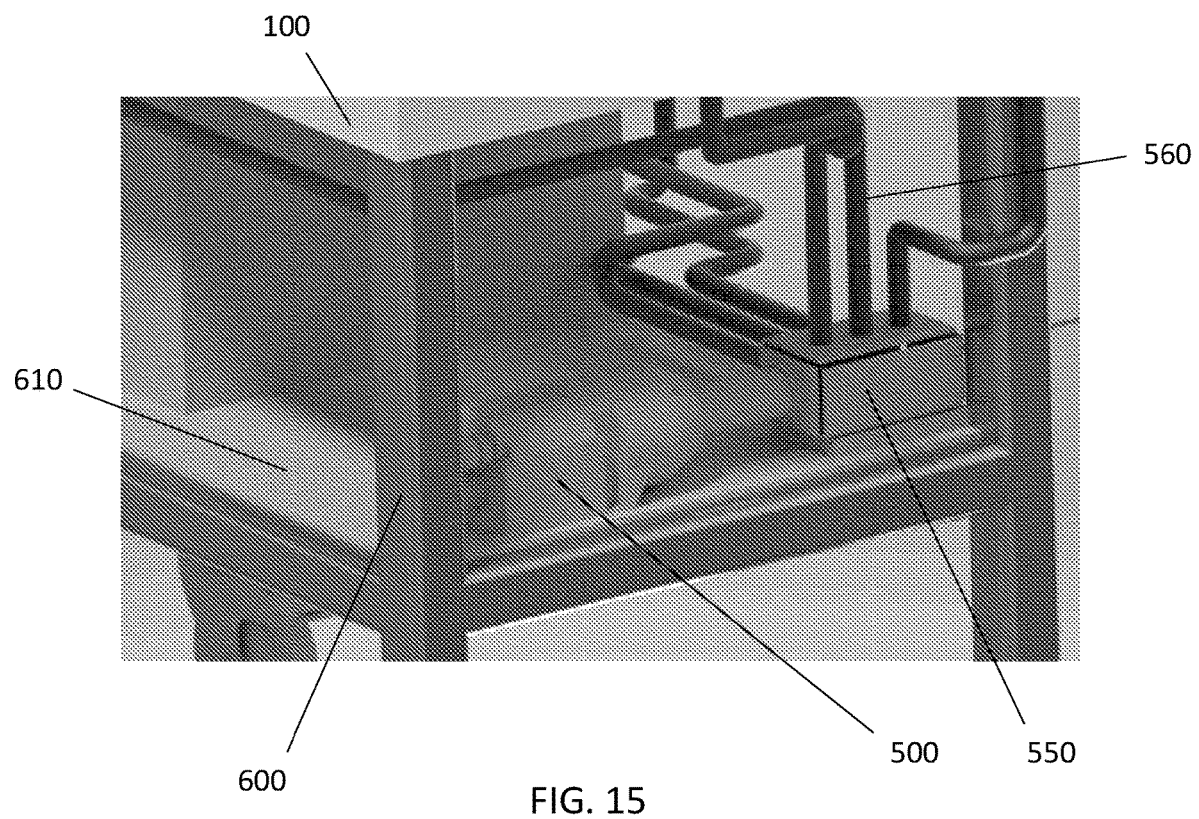
FIG. 15 is a schematic perspective view of a test chamber on a cart and a hot air blower and manifold on a shelf of the cart.

FIG. 15 is a schematic perspective view of a test chamber 100 on a cart 600 and a hot air blower 500 and manifold 550 on a shelf 610 of the cart 600. The hot air blower 500 is operably coupled to the manifold 550. Conduits 560 operably couple panel inlets of each panel of the test chamber 100 to the manifold 550 so that heated air may move through the void space of the panels to prevent condensation on the inner surface of the first wall of the panels when the test chamber is in use.

Figure 16:
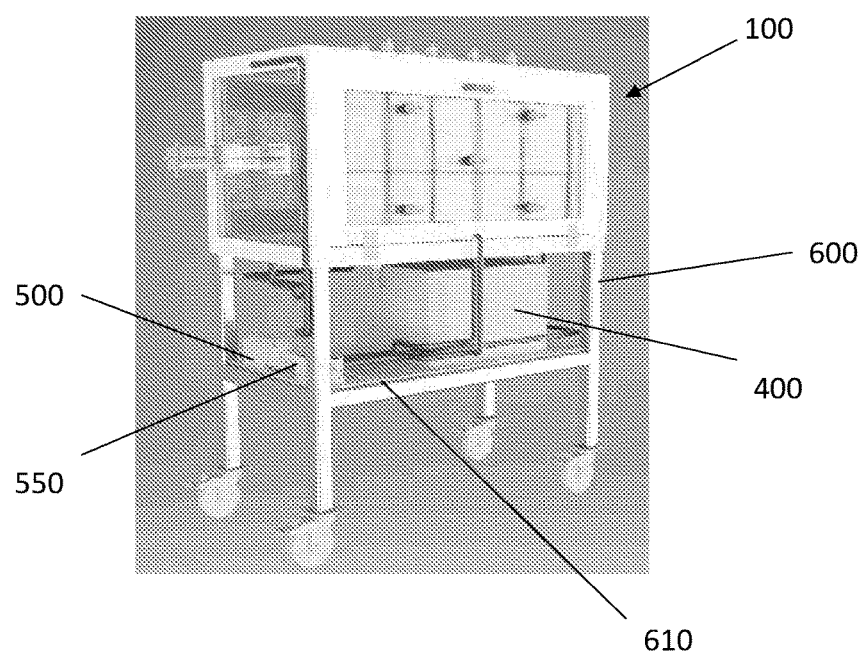
FIG. 16 is a schematic perspective view of components of a system on a cart.

FIG. 16 is a schematic perspective view of components of a system on a cart 600. A test chamber 100 is placed on top of the cart 100. Components, such as the humidifier 400, heated air blower 500 and manifold 550 are placed on a shelf 610 of the cart 600. The cart 600 includes wheels and is configured to be pushed or pulled by a user so that the system is portable.

Figure 17:
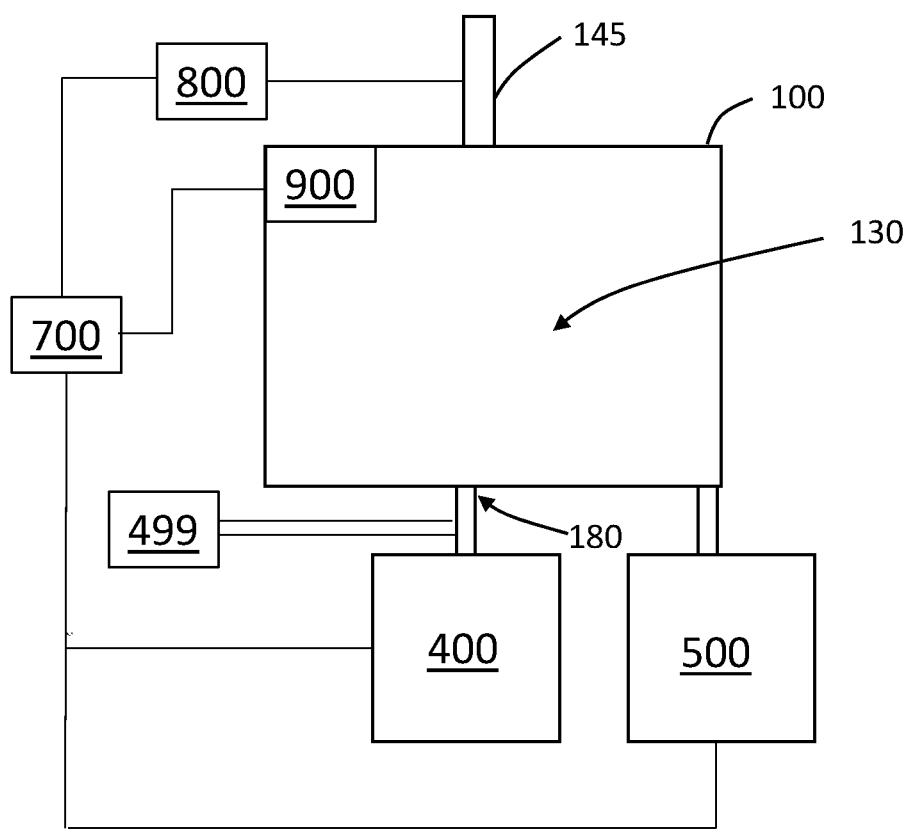
FIG. 17 is a schematic block diagram of components of a system.

FIG. 17 is a schematic block diagram of components of a system. The system includes a test chamber 100 having an enclosed interior volume 130, a chamber inlet port 180, and a chamber outlet port 145 comprising a valve. The system also comprises a motor 800, a pressure sensor 900, a humidifier 400, a hot air blower 500, and a controller 700. The controller 700 is operably coupled to the motor 800, the pressure sensor 900, the humidifier 400, and the hot air blower 500. The valve of the chamber outlet port 145 is operably coupled to the motor 800.

The hot air blower 500 is coupled to panel inlets of panels of the test chamber 100 to cause heated air to flow through void spaces of the panels to reduce or prevent condensation on the interior surface of the test chamber 100. The panel inlets are formed through the frame. The controller 700 is configured to control the temperature of the air blown by the hot air blower 500. The temperature of the air blown by the hot air blower 500 may be greater than the temperature of the air provided by the humidifier 400.

The humidifier 400 is operably coupled to the chamber inlet port 180 and is configured to provide conditioned air to the enclosed interior volume 130 of the test chamber 100 via the chamber inlet 180. The controller is configured to control the temperature, humidity, and flow rate of the conditioned air provided by the humidifier 400.

The pressure sensor 900 senses pressure in the enclosed interior volume 130 of the test chamber 100. The pressure sensor 900 may send data regarding pressure to the controller 700. The controller 700 may adjust the flow rate of conditioned air from the humidifier 400 to adjust pressure within the enclosed interior volume 130 of the test chamber 100 based on the data regarding pressure received from the sensor 900. The controller 700 may cause the motor 800 to adjust the valve of the chamber outlet port 145 to adjust pressure within the enclosed interior volume 130 of the test chamber 100 based on the data regarding pressure received from the sensor 900.

The system in FIG. 17 also includes a dilution valve 499 operably coupled to the chamber inlet port 180. The dilution valve 499 may permit aerosol, gases, or other components to be mixed with conditioned air directed through the chamber inlet port 499. The dilution valve 499 may mix the aerosol, gases, or other components with the conditioned air prior to entry into the enclosed interior volume 130 of the test chamber 100. The provision of a dilution valve 499 may advantageously enable the test chamber 100 to simulate a wide range of specific environmental situations for the aerosol study.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±2% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An apparatus for studying aerosol, comprising:
a test chamber comprising one or more panels defining an enclosed interior volume,
   each of the one or more panels having a first wall having a surface defining an interior of the test chamber and having a second wall defining an exterior of the test chamber,
   wherein a void space is defined between the first and second walls,
   wherein each of the panels comprises a panel inlet in communication with the void space and a panel outlet in communication with the void space,
   wherein air flowed through the void space has a temperature greater than the temperature in the enclosed interior volume of the test chamber;
a frame configured to retain the one or more panels, wherein one or both of the panel inlet and the panel outlet are defined through the frame;
a chamber inlet port extending through one of the one or more panels and defining an air inlet conduit in communication with the enclosed interior volume of the test chamber;
a chamber outlet port extending though one of the one or more panels and defining an air outlet conduit in communication with the enclosed interior volume of the test chamber;
a fan disposed in the enclosed interior volume of the test chamber, the fan positioned and configured to mix air in the enclosed interior volume; and
a trap port for sampling contents from the enclosed interior volume, the trap port extending through one of the one or more panels and comprising a valve to permit sampling of the contents in the enclosed interior volume.

2. The apparatus of claim 1, wherein the chamber inlet port is structured to extend through the first and second walls of a first panel of the one or more panels such that air flowing through the inlet port does not flow through the void space of the panel, and wherein the chamber outlet port is structured to extend through the first and second walls of a second panel of the one or more panels such that air flowing through the inlet port and outlet port does not flow through the void space of the panel.

3. The apparatus of claim 2, wherein the first and second panels are substantially parallel to one another.

4. The apparatus according to claim 1, further comprising:
an antechamber extending from one of the one or more panels, the antechamber defining a sealed antechamber port extending through the first and second walls of the panel; and
a tray disposed in the antechamber, the tray being slidable from a first position to a second position,
   the tray comprising a first wall and a second wall,
   wherein in the first position, the first wall seals the antechamber port from the interior of the test chamber, and
   wherein in the second position, the second wall seals the antechamber port from the exterior of the test chamber.

5. The apparatus according to claim 4, wherein the antechamber comprises a pivotable lid moveable from an open position to a closed position, wherein in the closed position the lid prevents access to the antechamber, and wherein the lid in the open position provides access to the antechamber.

6. The apparatus according to claim 1, wherein the trap port is one of a plurality of trap ports positioned at a variety of positions about the test chamber.

7. The apparatus according to claim 1, wherein the surface of the first wall that defines the enclosed interior volume of the test chamber is inert.

8. The apparatus according to claim 1, further comprising a dilution valve operably coupled to the chamber inlet port.

9. The apparatus according to claim 1, comprising an exposure panel port through which at least a portion of an exposure panel may be inserted into the enclosed interior volume of the test chamber.

10. A system comprising:
the apparatus according to claim 1;
air moving apparatus operably coupled to one or both of the panel inlet and the panel outlet of the one or more panels of the test chamber, wherein the air moving apparatus is configured to cause air to flow through the void space between the first and second walls of the one or more panels of the test chamber.

11. The system according to claim 10, wherein the test chamber comprises more than one panel, and wherein the system further comprises a manifold operably coupled to each panel inlet, each panel outlet, or each panel inlet and each panel outlet, wherein the manifold is operably coupled to the air moving apparatus such that the air moving apparatus and the manifold causes air to flow through void space of each panel.

12. The system according to claim 10, further comprising a heater positioned and adapted to heat air that enters the panel inlet.

13. The system according to claim 10, further comprising a humidifier operably coupled to the chamber inlet port, the humidifier configured to provide conditioned air to the enclosed interior volume of the test chamber.

14. The system according to claim 13, comprising a controller operably coupled to the humidifier, wherein the controller is configured and adapted to control the humidifier to control one or more of the air flow rate, temperature, and humidity of the conditioned air provided by the humidifier to the enclosed interior volume of the test chamber.

* * * * *